2,686,999

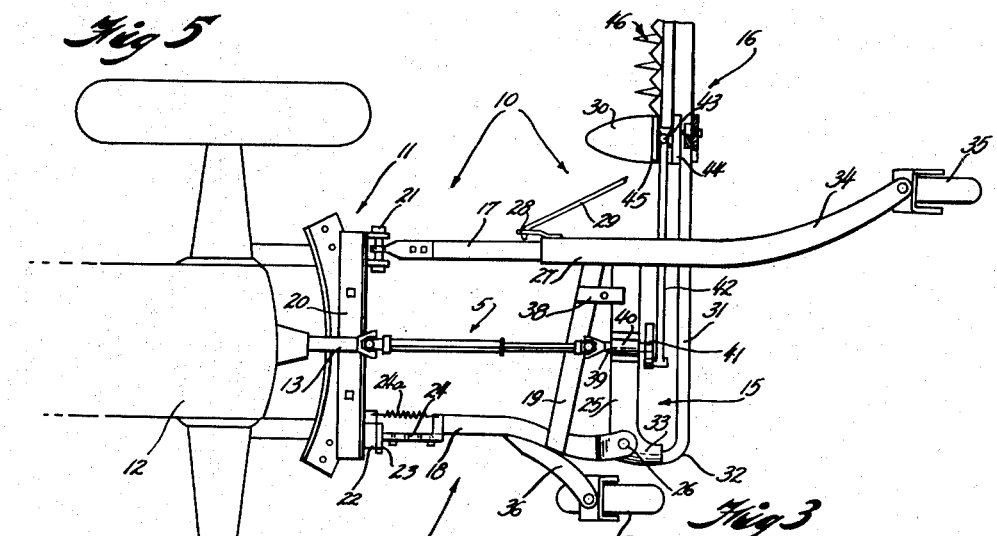
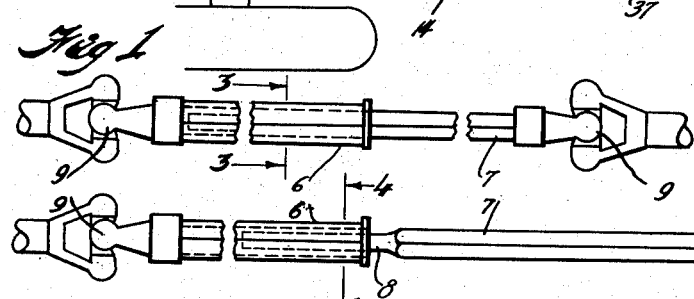
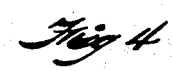
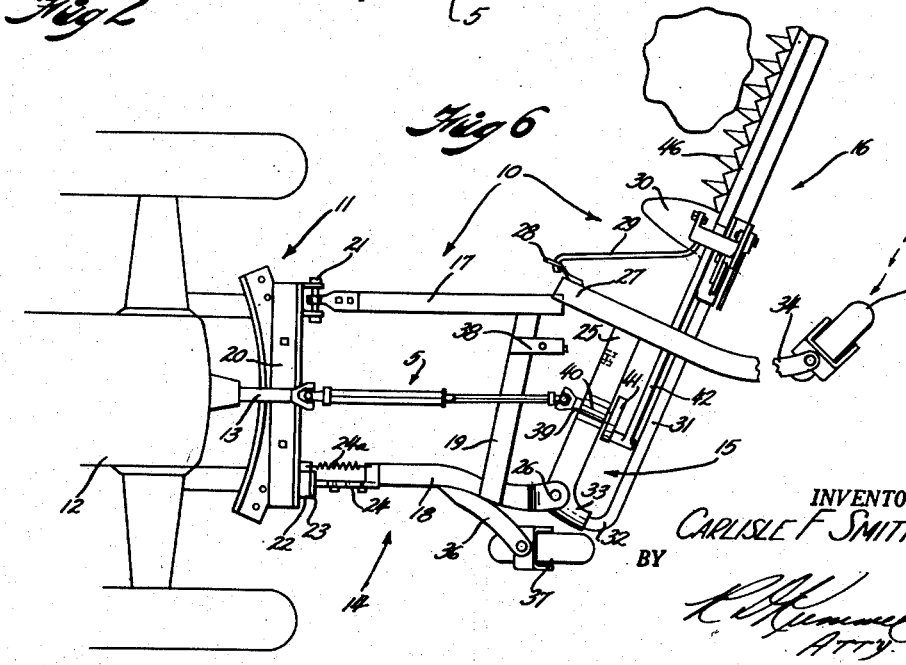
INVENTOR.
CARLISLE F SMITH Patented Aug. 24, 1954

UNITED STATES PATENT OFFICE 2,686,999

POWER TRANSMITTING MEANS

Carlisle F. Smith, Knoxville, Ill., assignor to J. I. Case Company, Racine, Wis., a corporation of Wisconsin Application June 20, 1951, Serial No. 232,589

6 Claims. (Cl. 56—25)

The present invention relates to a universal power shaft connecting driving and driven shafts and other power transmitting parts. The invention relates more particularly to a power shaft for use with an implement of the type adapted to be drawn behind a tractor serving firstly to connect the power shaft of the tractor to the driven mechanism of the implement, and secondly for automatically interrupting the transmission of power from the tractor to the implement when a part of the implement has been tripped so as to swing rearwardly.

Therefore, an object of the invention is to provide an extendable power shaft which is responsive to a force tending to increase its length so that the shaft will automatically interrupt its transmission of motion upon assuming a predetermined length.

Another object of the invention is to provide an extendable universal power shaft for use with a tractor and an implement which will automatically interrupt the transmission of motion from said tractor to said implement when said implement is rearwardly pivoted so as to increase the length of the power shaft a predetermined amount.

Still another object of my invention is to provide a power shaft which is so constructed and arranged as to be easily and expeditiously recoupled after the transmission of motion has been interrupted.

In the drawings, Fig. 1 is a fragmentary plan view of a power shaft embodying the present invention shown in a transmissive position;

Fig. 2 is a view similar to Fig. 1 showing the power shaft in a non-transmissive position;

Fig. 3 is a sectional view of the power shaft taken on the line 3—3 of Fig. 1;

Fig. 4 is a sectional view of the power shaft taken on the line 4—4 of Fig. 2;

Fig. 5 is a fragmentary plan view of a mower propelled behind a tractor and operatively connected thereto by the power shaft embodying the present invention;

Fig. 6 is a view similar to Fig. 5 with parts in a released position after contact with an obstruction.

The invention is shown as embodied, in the present instance, in an extendable power shaft 5 as disclosed specifically in Figs. 1–4 of the drawings. The power shaft is made up in the present instance of a sleeve 6 comprising a tube of square or other polygonal cross section and a member 7 arranged to fit telescopically within the sleeve 6 so that the rotary motion of one member will drive the other member in the same direction and at the same rate of speed when the member 7 is inserted sufficiently in the sleeve 6 as will appear. A portion 8 of the member 7 adjacent the extremity which is insertable in sleeve 6 is turned so that in cross section it is substantially cylindrical, the diameter of the turned portion being small enough to permit the turned portion to rotate freely in the sleeve 6 while still being sufficiently large to prevent any play between the sleeve and the member 7 when only the turned portion is inserted in the sleeve. In the embodiment illustrated in the drawings, the member 6 is shown as substantially square in cross section as previously mentioned. The diameter of the turned portion 8 is therefore preferably equal to the width of the flats of the member 7 and tangent thereto substantially at the center of the flats so as to rotate freely in the sleeve 6 when the member 7 is extended so that only the portion 8 remains in the sleeve. Suitable connections 9 are fixed to the ends of the sleeve 6 and the member 7 for universally connecting the shaft between a driving element and a driven element. It will now be apparent, considering that the sleeve 6 is connected to a driving element and the member 7 is connected to a driven element, that the member 7 will rotate with the sleeve 6 when the member 7 is sufficiently telescoped into the sleeve 6 so that the flats of the member 6 are positioned adjacent the corresponding elements of the sleeve 7; however, when the member 7 is withdrawn from the sleeve 6 sufficiently so that only the turned portion 8 remains in the sleeve 6, the sleeve 6 will rotate freely on the turned portion 8 without transmitting said motion to the member 7.

A power shaft of the above description has particular utility in power take-off mechanisms such as are used extensively in power farming operations to transmit power from the engine of the tractor directly to an operating mechanism or mechanisms on an agricultural implement of the type which has a part adapted to pivot rearwardly when encountered by an obstruction. When implements of this type are tripped so as to swing rearwardly, the power shafts are extended and an excessive angle of deflection is imposed on the universal connections which causes vibration and at times locking against rotation. It should be appreciated that the power shaft as described above will interrupt the transmission of motion from the tractor to the implement when the implement is tripped so as to extend the shaft to a predetermined length, before an excessive angle of deflection is imposed upon the universal connections.

Referring to Figs. 5 and 6, I have disclosed the invention in combination with a conventional mower drawn by a propelling means such as a tractor for transmitting the rotary motion of a conventional power take-off shaft of the tractor to a driven shaft carried by the mower for driving the instrumentalities of the mower as will appear hereinafter. Since the mower in the present instance is of any suitable type or nature adapted to be drawn behind a tractor and having a part adapted to be horizontally pivoted when encountered by an obstruction, such as a tree stump or the like, no attempt has been made to describe it specifically as it is assumed that the form and connections will be readily understood from the drawings. As seen the mower comprises a frame unit generally designated as 10 which is connected at 11 to a tractor 12 which since it forms no part of the present invention need not be further described except to say that it has the usual power take-off shaft 13 extending from the rear thereof. The frame unit 10 is made up of a front frame section 14 and a rear frame section 15, a cutter bar 16 of any suitable type being carried by the rear frame section. The mower is accordingly drawn behind the tractor and actuated thereby as will appear.

The front frame 14 includes in the present instance fore-and-aft extending portions 17 and 18 united by a cross bar 19. It is to be understood that these members may be of any of the usual metallic or other shapes in common use in mowers of this type. A support bar 20, which constitutes the connecting means between the tractor and the mower is secured to the rearward end of the tractor so as to engage a quadrant fixed on the tractor for well-known purposes. The member 17 is connected for universal movement to a bolt 21 secured transversely with the supporting bar 20 so as to provide for up and down swinging of the member 17. It should be apparent from the drawings that the member 17 is in the present instance allowed sufficient freedom to provide for substantial misalignment or swinging in the horizontal plane as well as in the vertical plane, as disclosed in the patent to Schroeppel, 2,331,863, October 12, 1943.

As previously mentioned the member 17 is maintained in fixed relation to the member 18 by the cross bar 19 and in fact in operation these members constitute together with the entire rear frame 15 the frame unit 10. The cross bar 19 is connected with the members 17 and 18 as by welding, rivets, bolts or the like. It should be apparent that the rearward reaction of the crop across the cutter bar 16 will tend to swing the entire assembly in a substantially horizontal plane about the bolt 21 as a fulcrum tending to cause forward movement of the member 18 relative to the support bar 20. To resist this a suitable abutment means 22 is provided on the support bar 20, the abutment means in the present instance being a block of resilient compressible material such for example as rubber. The member 18 has a T head 23 in the present instance provided with a shank 24 which in turn has holes formed therein so that the relative position of the head and the member 18 can be adjusted as desired. It should be apparent that the before mentioned rearward reaction against the cutter bar 16 will maintain the T head 23 in contact with the abutment 22. Also the T head 23 may slide or be shifted up and down relatively to the abutment 22 as induced by the rocking movement of either the tractor or the mower. It should be appreciated that the adjustment provided by the holes in the shank 24 will affect the working position of the mower, and that this adjustment may be used to locate the cutter bar 16 at right angles to or in any other desired relation to the direction of travel. When the rearward reaction of the cutter bar 16 is lacking, as for instance when the machine is being transported, a spring 24a is provided for maintaining a definite pressure against the abutment 22.

The rear frame section 15 comprises in the present instance a cross member 25 hinged at 26 to the rearward extremity of member 18 for swinging in a substantially horizontal plane. The cross member 25 extends beneath the member 17 and has a forwardly extending extension 27 carrying an ear 28 to which is attached a brace 29. The extension 27 is preferably hollow or channel-shaped and receives within itself the rear extremity of the frame member 17. This provides for substantially rigid alignment of the member 17 and the extension 27 when the cutter bar 16 is in an operative position as shown in Fig. 5.

The brace 29 extends to an inner shoe 30 of any well-known type on the cutter bar 16. A push rod 31 extends transversely of the machine from the shoe 30 and has a forwardly extending portion 32 engaged in a bearing 33 constituting a portion of the cross member 25. Through these members the inner shoe 30 and accordingly the cutter bar 16 are propelled upon forward motion of the frame unit 10 in well-known manner. Well-known expedients are provided for raising the cutter bar 16, the inner shoe 30, and the push rod 31 vertically about the bearing 33. However, since these expedients form no part of the present invention, they are not illustrated or described.

The cross member 25 also has a rearwardly extending arm 34 above the push rod 31 which has rearwardly connected thereto a caster wheel 35. The member 18 has secured thereto a supporting bracket 36 which extends outwardly therefrom for pivotally securing a caster wheel 37. It will now be apparent that the frame unit 10 will trail behind the tractor, supported by the caster wheels 35 and 37, thus propelling the cutter bar 16 in the desired direction and position.

Latch means 38 are provided on the cross member 19 for releasably connecting the cross member 25 with the cross member 19. It should be appreciated that the latch means can be of any suitable or well-known construction to serve the purpose of a positive connection for the front and rear frames 14 and 15 for normal operation. However, in the event that the cutter bar encounters an obstruction, the latch must be so constructed as to release the cross member 25 for permitting the cutter bar 16 to swing rearwardly substantially in the horizontal plane about the hinge 26 as shown in Fig. 6 and as well known in the art. Under this condition the caster wheel 35 will swing sharply as indicated in dotted lines Fig. 6 so that no part of the mower is unduly stressed.

When it is desired to restore the parts to an operative position it is merely necessary to back the tractor so that cutter bar 16 and the rear frame section 15 will swing forwardly until the cross member 25 is positively connected to the cross member 19 by the latch means 38. At the same time the forward extension 27 takes a position embracing the rearward extremity of the member 17, thereby restoring the parts to a working position.

In the present instance the extendable power shaft is universally connected between the power take-off shaft 13 and a driven shaft 39 by means of the attachments 9 as previously suggested. The driven shaft 39 is carried by the cross member 25 by a suitable bearing 40 and has a crank or fly wheel 41 with which is connected a pitman 42 of suitable or well-known construction. The pitman 42 is connected with a knife head 43 which is reciprocable in guides 44 and 45 and constitutes part of a sickle generally designated as 46.

As should be apparent rotation of the power take-off 13 will be imparted to the driven shaft 39 for driving the pitman 42 in a well-known manner by means of the power shaft 5. The flexibility of the attachments 9 and the extensibility of the sleeve 6 and member 7 will provide for universal movement of the frame unit 10 relative to the tractor 12 without interfering with the drive through the power shaft 5 and the proportions are so chosen for the sleeve 6 and the member 7 that this will be true under the conditions illustrated in Fig. 5. However, in the event of encountering an obstruction, as shown in Fig. 6, the rear frame 15 will swing rearwardly as previously mentioned pulling thereby the member 7 out of the sleeve 6. When the member 7 has been pulled sufficiently out of the sleeve 6 so that only portion 8 remains therein, the transmission of motion from the sleeve to the member 7 is interrupted as previously explained. It should be apparent that the member 7 and the portion 8 are so proportioned that the disruption of the transmission of motion will occur just before the angle of deflection between the driven shaft 39 and the member 7 becomes excessive thereby eliminating vibrations in the power shaft when forced into a non-operating angle. When the operator wishes to restore the parts to an operative position, it is merely necessary to back the tractor until the rear frame 15 is latched by means of the latching means 38 to the front frame 14, the member 7 being consequently telescoped within the sleeve 6 a proportionate distance so that the flats of the member are again adjacent the corresponding parts of the sleeve, turning either member 6 or member 7 somewhat if necessary for the parts to register.

The above being a complete description of an illustrative embodiment of the invention, what I claim as new and desire to be secured by Letters Patent of the United States is:

1. A universal power shaft for transmitting motion from a driving means to a driven means including a shaft having flat sides in cross section, and a sleeve having a complementary opening formed therein for slidably receiving therein said shaft for effecting a driving connection between said shaft and said sleeve, said shaft having a turned portion formed adjacent the end thereof for interrupting the transmission of motion from said driving means to said driven means when said power shaft assumes a length wherein only said turned portion is received in said sleeve, the diameter of said turned portion being so formed as to permit relative rotative movement between said shaft and said sleeve while maintaining said shaft and said sleeve in axially aligned relationship.

2. A universal power shaft for transmitting motion from a driving means to a driven means including a shaft substantially square in cross section, and a sleeve having a complementary opening formed therein for slidably receiving therein said shaft for effecting a driving connection between said shaft and said sleeve, said shaft having a turned portion formed adjacent the end thereof for interrupting the transmission of motion from said driving means to said driven means when said power shaft assumes a length wherein only said turned portion is engaged in said sleeve, the diameter of said turned portion being substantially equal to the width of the flats of said shaft and tangent thereto substantially at the center of the flats so as to permit relative rotative movement between said shaft and said sleeve, said turned portion being formed of a length sufficient to maintain said shaft and said sleeve in axially aligned relationship upon the transmission of motion from said driving means to said driven means being interrupted.

3. In a tractor and an implement drawn by said tractor and having a part adapted to swing rearwardly about a substantially vertical axis when encountered by an obstruction: the improvement comprising a universal power shaft carried by said tractor and said swingable part of said implement laterally of said vertical axis for driving the instrumentalities of said implement from said tractor when said implement is operatively positioned with respect to said tractor and for interrupting the transmission of motion from said tractor to said implement when said swingable part of said implement swings rearwardly sufficiently to lengthen said power shaft a predetermined amount comprising a shaft having flat sides in cross section, a sleeve having a complementary opening formed therein for telescopically receiving said shaft for effecting a driving connection between said shaft and said sleeve, said shaft having a cylindrical portion formed adjacent the end thereof for interrupting the transmission of motion between said shaft and said sleeve upon said power shaft's assuming a length wherein only said cylindrical portion is received in said sleeve, the diameter of said cylindrical portion being so formed as to permit relative rotative movement between said shaft and said sleeve while maintaining said shaft and said sleeve in axially aligned relationship.

4. In a tractor and an implement drawn by said tractor and having a part adapted to swing rearwardly about a substantially vertical axis when encountered by an obstruction: the improvement comprising a universal power shaft carried by said tractor and said swingable part of said implement laterally of said vertical axis for driving the instrumentalities of said implement from said tractor when said implement is operatively positioned with respect to said tractor and for interrupting the transmission of motion from said tractor to said implement when said swingable part of said implement swings rearwardly sufficiently to lengthen said power shaft a predetermined amount comprising a shaft substantially square in cross section, a sleeve having a complementary opening formed therein for slidably receiving therein said shaft for effecting a driving connection between said shaft and said sleeve, said shaft having a cylindrical portion formed adjacent the end thereof for interrupting the transmission of motion between said shaft and said sleeve upon said power shaft's assuming a length wherein only said cylindrical portion is received in said sleeve, the diameter of said cylindrical portion being substantially equal to the width of the flats of said shaft and tangent thereto at the centers of the flats so as to permit relative rotative movement between said shaft and said sleeve, said cylindrical portion being formed of a length sufficient to maintain said shaft and said sleeve in axially aligned relationship upon the transmission of motion between said shaft and said sleeve being interrupted.

5. In a tractor and a trail-type mower including a front frame secured to said tractor, a rear frame including a cutter bar hinged to said front frame for relative movement in a substantially horizontal plane about a substantially vertical axis, and means for latching said frame unit into an operative position except in cases of excessive stress upon said rear frame: the improvement comprising a universal power shaft carried by said tractor and said rear frame laterally of said vertical axis for driving the instrumentalities of said cutter bar when said rear frame is operatively positioned with respect to said front frame and for interrupting the transmission of motion from said tractor to said cutter bar when said rear frame swings rearwardly sufficiently to lengthen said power shaft a predetermined amount comprising a shaft having flat sides in cross section, a sleeve having a complementary opening formed therein for telescopically receiving said shaft for effecting a driving connection between said shaft and said sleeve, said shaft having a cylindrical portion formed adjacent the end thereof for interrupting the transmission of motion between said shaft and said sleeve upon said power shaft's assuming a length wherein only said cylindrical portion is received in said sleeve, the diameter of said cylindrical portion being so formed as to permit relative rotative movement between said shaft and said sleeve while maintaining said shaft and said sleeve in axially aligned relationship.

6. In a tractor and a trail-type mower including a front frame secured to said tractor, a rear frame including a cutter bar hinged to said front frame for relative movement in a substantially horizontal plane about a substantially vertical axis, and means for latching said frame unit into an operative position except in cases of excessive stress upon said rear frame: the improvement comprising a universal power shaft carried by said tractor and said rear frame laterally of said vertical axis for driving the instrumentalities of said cutter bar when said rear frame is operatively positioned with respect to said front frame and for interrupting the transmission of motion from said tractor to said cutter bar when said rear frame swings rearwardly sufficiently to lengthen said power shaft a predetermined amount comprising a shaft substantially square in cross section, a sleeve having a complementary opening formed therein for slidably receiving therein said shaft for effecting a driving connection between said shaft and said sleeve, said shaft having a cylindrical portion formed adjacent the end thereof for interrupting the transmission of motion between said shaft and said sleeve upon said power shaft's assuming a length wherein only said cylindrical portion is received in said sleeve, the diameter of said cylindrical portion being substantially equal to the width of the flats of said shaft and tangent thereto at the centers of the flats so as to permit relative rotative movement between said shaft and said sleeve, said cylindrical portion being formed of a length sufficient to maintain said shaft and said sleeve in axially aligned relationship upon the transmission of motion between said shaft and said sleeve being interrupted.

References Cited in the file of this patent

UNITED STATES PATENTS

| Number | Name | Date |
|---|---|---|
| Re. 21,734 | Crumb et al. | Mar. 4, 1941 |
| 193,456 | Osmond | July 24, 1877 |
| 747,298 | Carroll | Dec. 15, 1903 |
| 947,962 | Butler | Feb. 1, 1910 |
| 2,269,980 | MacDonald | Jan. 13, 1942 |
| 2,314,215 | Hilblom | Mar. 16, 1943 |
| 2,502,805 | Spurlin | Apr. 4, 1950 |
| 2,520,743 | Tanke | Aug. 29, 1950 |